United States Patent
Martin et al.

(10) Patent No.: US 11,945,298 B2
(45) Date of Patent: Apr. 2, 2024

(54) FUEL TANK ISOLATION VALVE AND RELATED METHOD OF USE

(71) Applicant: DELPHI TECHNOLOGIES IP LIMITED, St. Michael (BB)

(72) Inventors: Thomas Rodrigues Martin, Auburn Hills, MI (US); Carla Patricia Lara Ramirez, Chihuahua (MX)

(73) Assignee: DELPHI TECHNOLOGIES IP LIMITED, St. Michael (BB)

(*) Notice: Subject to any disclaimer, the term of this patent is extended or adjusted under 35 U.S.C. 154(b) by 0 days.

(21) Appl. No.: 17/901,382

(22) Filed: Sep. 1, 2022

(65) Prior Publication Data

US 2024/0075806 A1    Mar. 7, 2024

(51) Int. Cl.
*B60K 15/035*  (2006.01)
*F02D 41/00*   (2006.01)

(52) U.S. Cl.
CPC ...... *B60K 15/03519* (2013.01); *F02D 41/004* (2013.01)

(58) Field of Classification Search
CPC ................ B60K 15/03519; F02D 41/004
See application file for complete search history.

(56) References Cited

U.S. PATENT DOCUMENTS

| | | | | |
|---|---|---|---|---|
| 5,406,975 A | * | 4/1995 | Nakamichi | F16K 31/0655 251/129.03 |
| 5,419,367 A | * | 5/1995 | Noya | F16K 31/0672 251/129.17 |
| 7,530,605 B2 | * | 5/2009 | Rigollet | F16L 37/144 285/305 |
| 8,171,952 B2 | | 5/2012 | Martin et al. | |
| 9,404,601 B2 | * | 8/2016 | Yoshida | F16K 31/0679 |
| 9,500,291 B2 | | 11/2016 | Pifer et al. | |
| 11,215,147 B2 | * | 1/2022 | Brock | F02M 25/0854 |
| 2001/0017160 A1 | * | 8/2001 | Ishigaki | F16K 31/082 137/519 |
| 2010/0269921 A1 | * | 10/2010 | Pifer | F02M 25/0836 137/511 |
| 2016/0298778 A1 | * | 10/2016 | Young | F02M 25/0836 |

* cited by examiner

*Primary Examiner* — Patrick C Williams
(74) *Attorney, Agent, or Firm* — WARNER NORCROSS + JUDD LLP

(57) ABSTRACT

A fuel tank isolation valve is provided having a main valve body including a fuel tank port and a canister port, a main bore, and an actuator selectively operable to allow or inhibit vented fuel vapors to move from the first port to the second port along a first path. The body can define an airflow bypass orifice that allows vapors to move from the first port, through the main bore, to the second port along a second path, while the actuator is in the closed mode inhibiting vapors from moving along the first path. This flow through the orifice can equalize pressure in a fuel tank and the canister during a purging operation on the canister. The valve can include a fitting that directly couples the valve to the canister without any intermediate hoses, in a cantilevered manner. A related method of use is provided.

16 Claims, 6 Drawing Sheets

FUEL TANK ISOLATION VALVE AND RELATED METHOD OF USE

BACKGROUND OF THE INVENTION

The present invention relates to evaporative emissions control systems on vehicles, and more particularly to a fuel tank isolation valve disposed between a fuel tank and a fuel vapor canister.

As a result of strict environmental and safety regulations imposed on manufacturers of internal combustion engine powered vehicles and hybrid vehicles, fuel vapor or evaporative emissions control systems and associated components thereof have become increasingly complex. Some regulations affecting the automotive industry require that fuel vapor emissions from a ventilation system of a fuel tank be stored, typically in a fuel vapor canister. To ensure continued, satisfactory function of the fuel vapor canister, periodic purging of hydrocarbon vapors stored in the canister is performed.

More particularly, in many evaporative emissions control systems, vapors from the fuel system, and in particular, the fuel tank, are vented to a fuel vapor canister containing activated carbon or some other adsorbent media. The fuel vapors can be vented to the canister via a fuel tank isolation valve under a pressure that is produced due to sloshing of fuel in the tank, refueling and/or evaporation of fuel in the tank. The valve can manage the pressure and release the fuel vapor to the canister upon command. The carbon or other media in the canister adsorbs the vented fuel vapors and effectively stores them to prevent them from being released to the environment. After time, however, the canister needs to be purged of the stored vapors so that the canister and media can continue to operate properly, capturing and adsorbing additional fuel vapors from the tank.

In a typical purging mode, ambient air is drawn through the canister due to a vacuum produced by an engine of the vehicle. As this occurs, the vacuum pulls the stored vapors from the canister into the engine where the vapors eventually are burned. An issue with the purging mode in many conventional systems, however, is that the vacuum also draws fuel vapors from the fuel tank so that those new fuel vapors enter the canister. As a result, those new vapors can adsorb to the media, even as the previously stored vapors are drawn to the engine for burning. This reduces the purge effectiveness, and compromises the canister's emissions functionality. Alternatively, the new vapors can pass from the canister to the engine, along with a regular fuel flow. With the excessive fuel, some of it may not be burned. This can reduce fuel economy or cause unintentional tailpipe emissions.

Another issue with many evaporative emissions control systems is that the fuel tank isolation valve is fixedly mounted to some vehicle component, distal from the fuel tank and the canister. This requires a special bracket and fasteners that penetrate part of the vehicle component. Separate hoses also are routed from the fuel tank to the valve, and from the valve to the canister. These extra hoses, their mounts and connections increase the cost and complexity of the system, and increase the potential for failure of the system due to leaks.

Accordingly, there remains room for improvement in the field of evaporative emissions control systems and associated fuel tank isolation valves to promote efficiency and reduce potential leaks in those systems.

SUMMARY OF THE INVENTION

A fuel tank isolation valve is provided having a main valve body including a fuel tank port and a canister port, a main bore, and an actuator selectively operable to allow or inhibit vented fuel vapors to move from the first port to the second port along a first path.

In one embodiment, the main valve body can define an airflow bypass orifice that allows vapors to move from the first port, through the main bore, to the second port along a second path, while the actuator is in the closed mode inhibiting vapors from moving along the first path. This flow through the orifice can equalize pressure in a fuel tank and a canister during a purging operation to regenerate the canister.

In another embodiment, the fuel tank isolation valve can include a fitting that directly couples the valve to the canister without any intermediate hoses. The direct engagement of the fitting with a connector of the canister optionally can result in the support of the main valve body in a cantilevered manner relative to the canister. Thus, the fuel tank isolation valve can be mounted and supported by to the canister itself, rather than by a bracket securing the valve to another component of a vehicle in which the valve is used.

In still another embodiment, the valve can include a cover joined with the main valve body and mounted in an opposing manner relative to the actuator. The cover can close off a portion of the main bore defined by the body.

In yet another embodiment, the main body can include an outer rim. The cover can include a base and a wall. The base can be joined with the outer rim of the main valve body. The wall can extend away from the outer rim. The cover can define a cover cavity that is common with the main bore. The airflow bypass orifice can be fluidly isolated within the cavity and main bore, out of fluid communication with the environment.

In even another embodiment, the airflow bypass orifice can include a first opening defined by the outer rim. The airflow bypass orifice can include a second opening that opens to the second port.

In a further embodiment, the cover can convey fuel vapors from the fuel tank passing along the second path through the main bore and the cover cavity to enter the first opening in the outer rim and exit the second opening into the second port when the actuator is in a closed mode. This flow along the second path through the airflow bypass orifice can equalize pressure within the fuel tank and canister during a purging operation on the canister in which a vacuum is drawn by an engine through the canister.

In still a further embodiment, the actuator can be a vent solenoid comprising a biasing member that biases a sealing member away from a shoulder of the vent solenoid in the open mode. The actuator can function normally in the open mode, that is, when the solenoid is not powered, the solenoid is open to allow vapors to flow along the first path, generally uninhibited by the solenoid.

In yet a further embodiment, the vent solenoid compresses the biasing member so that the sealing member engages the shoulder in the closed mode to inhibit flow along the first path, from a fuel tank of a vehicle, to the first port, through the main bore, to the second port and ultimately to the canister.

In even a further embodiment, fitting can be in the form of a push to connect fitting. That fitting can be joined with or form a party of the main valve body. The fitting can define a female receiving bore configured to receive a male connector extending outward from the canister, without an intervening hose disposed between the canister and the fitting.

In another embodiment, the fitting can include an o-ring, a spacer adjacent the o-ring and a clip. The clip can be operable in a lock mode in which the clip engages the male connector to secure the fitting to the canister in a sealed and fixed configuration. The clip also can be operable in a release mode in which the clip allows the male connector to exit the female receiving bore.

In still another embodiment, a method is provided. The method can include providing a main valve body having a first port and a second port, the second port including a fitting defining a female receiving bore, the main valve body housing an actuator in a main bore that is in fluid communication with the first port and the second port, the main valve body defining an airflow bypass orifice in fluid communication with the first port and with the second port; placing a male connector extending outward from a fuel vapor canister in the female receiving bore, without any intervening hose disposed between the canister and the fitting; and engaging the fitting so that a clip, adjacent a spacer and an o-ring, converts from a release mode to a lock mode in which the clip engages the male connector to secure the fitting to the canister in a sealed configuration. The fitting and canister can be secured directly to one another with the main valve body supported in a cantilevered manner by the male connector of the fuel vapor canister.

In yet another embodiment, the method can include operating the vent solenoid in a closed mode in which fuel vapors are inhibited from moving from the first port to the second port through the main bore along the first path due to the vent solenoid occluding the first path.

In even another embodiment, the method can include conveying fuel vapors via the airflow bypass orifice from the first port, through the main bore, to the second port along a second path, while the vent solenoid is in the closed mode, and the fuel vapors are inhibited from moving from the first port to the second port through the vent solenoid and main bore along the first path due to the vent solenoid occluding the first path in the closed mode.

In another embodiment, the conveying of fuel vapors along the second path through the airflow bypass orifice can equalize pressure within the fuel tank and canister during a purging operation on the canister in which a vacuum is drawn by an engine through the canister.

The current embodiments and related methods can provide a simplified and efficient fuel tank isolation valve with enhanced functionality. Where present, a high volume, existing normally open vent solenoid can actuate as a fuel tank isolation valve, inhibiting fuel vapors from a fuel tank of a vehicle from being excessively drawn into a fuel vapor canister during a purging operation. However, where present, the airflow bypass orifice still can equalize pressure within the fuel tank and the canister during the purging operation. The canister can maintain its effectiveness and thus continue to function with good efficiency during other modes after the purging operation. Where the main valve body valve includes an interface with the canister, the valve can be mounted directly to the canister, optionally in a cantilevered manner via the fitting. With this direct connection to the canister, extra hose connections, brackets for the valve and other components that add complexity to the system can be eliminated. Further, with fewer connections, the valve and system are less prone to failures and thus leakage of fuel vapors from the system. This can better isolate the fuel system from the environment, and reduce the incidence of leaks and corresponding costly diagnosis and repairs of the system.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
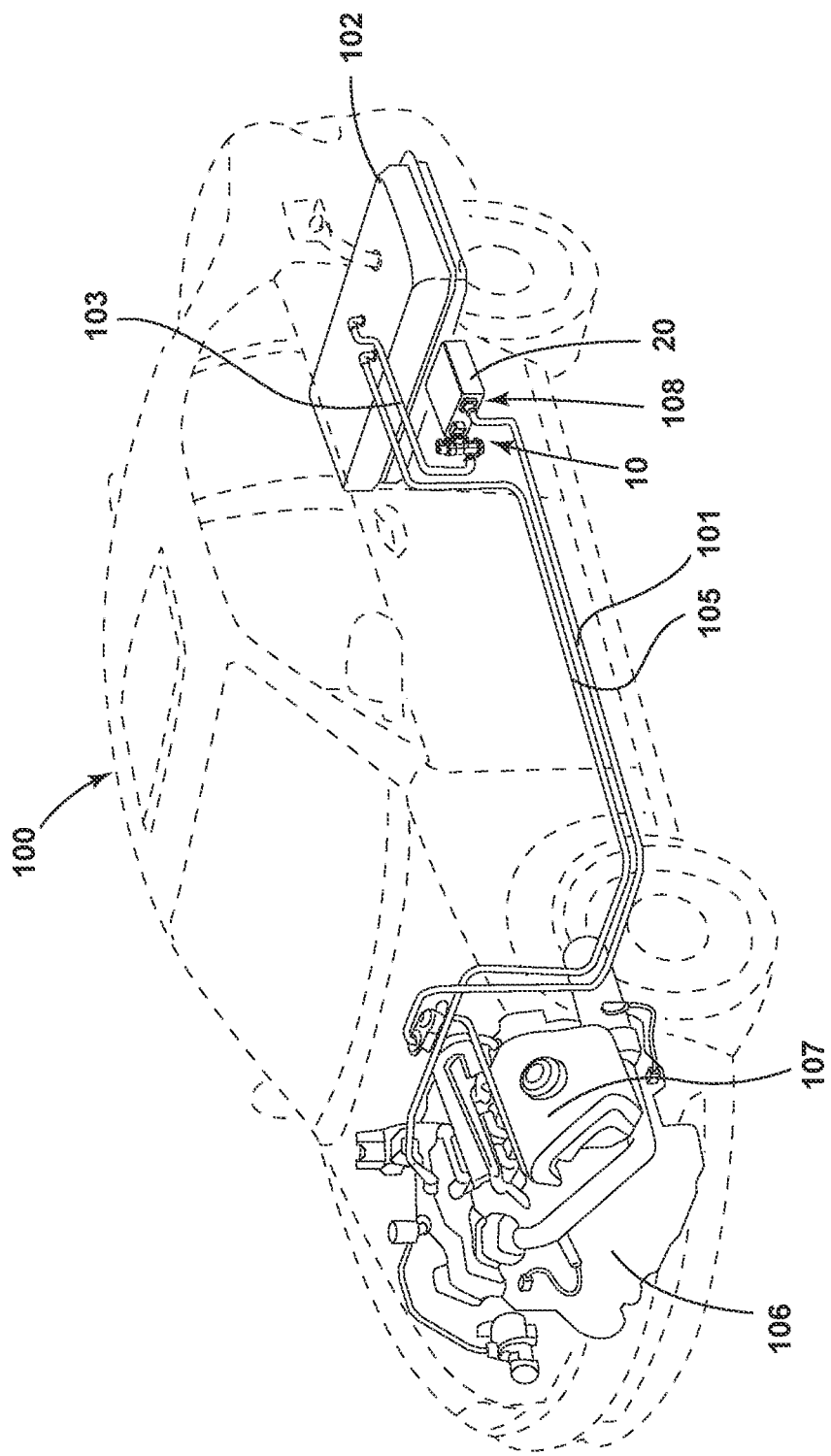
FIG. 1 is a perspective view of a vehicle including a fuel tank isolation valve of a current embodiment.

A current embodiment of the fuel tank isolation valve is shown in FIGS. 1-6 and generally designated 10. The fuel tank isolation valve (FTIV) 10 is shown installed in a vehicle 100, forming part of an evaporative emissions control system 108, which is generally configured to capture and recycle emitted fuel vapor from the fuel tank 102. The vehicle 100 can be any type of vehicle that uses a liquid fuel source such as gasoline. As shown, the vehicle is a passenger vehicle or automobile. Of course, other types of vehicles, such as light duty trucks, buses, tractors, equipment and other machinery are suitable for use with the FTIV 10 of the current embodiment. In some embodiments, the vehicle 10 can include an internal combustion engine, while in other embodiments, the vehicle can be a hybrid vehicle. The fuel tank 102 can be configured as a reservoir or container that holds fuel to be supplied to an internal combustion engine via a fuel delivery system of the vehicle. Fuel can be delivered through a fuel delivery line 105 to an intake manifold 107 to the engine 106. The evaporative emissions control system 108 and its various components including the FTIV 10 can be controlled by an electronic module that manages that system for the vehicle 100.

Among other things, the evaporative emissions control system 108 can include a fuel vapor canister 20. This canister 20 can be rigidly secured to the body or frame of the vehicle, generally in a fixed position relative to the fuel tank. The canister 20 can include charcoal, carbon, or another adsorbent media that can capture, hold and release (under certain conditions) molecules of fuel vapor, which can be a combination of those molecules and air that encounters the media in the canister. The canister can be in fluid communication with the fuel tank 102 via a first vapor transfer line or hose, generally in the form of a tube or first line 103 that is connected at one end to the fuel tank, optionally with a baffle arranged near the connection, and at the other end to the canister 20. Via this connection, fuel vapors from the fuel in the fuel tank that convert to an gaseous form can travel through this first line 103 to the canister 20 and can be captured by the adsorbent media therein.

The canister 20 can also be in fluid communication with the intake manifold 107 of the engine via a fuel vapor vent line or hose 101. This line 101 can lead directly to the intake manifold, and can include a number of other valves or components between the canister and the intake manifold to control the delivery of stored fuel vapors from the canister to the engine in a purging operation, in which fuel vapor stored in the canister 20 are pulled or otherwise moved to the intake by a vacuum drawn by the engine through the line 101 to the purge canister.

Figure 2:
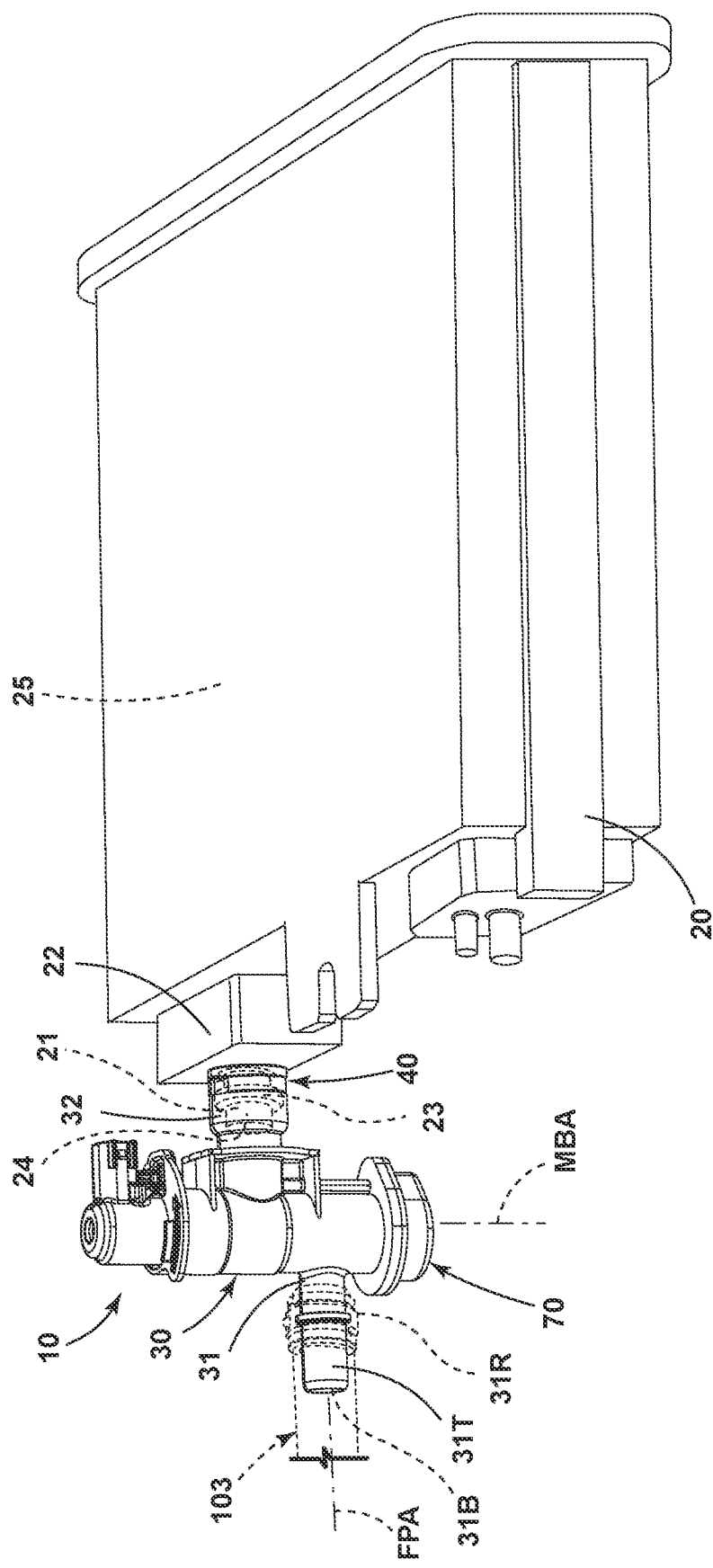
FIG. 2 is a perspective close-up view of the fuel tank isolation valve mounted on a vapor canister in a cantilevered manner.

The FTIV 10 can be disposed between the fuel tank 102 and the purge canister 20. As shown in FIGS. 1 and 2, the FTIV 10 can be mounted directly to the canister 20, optionally with the canister or a portion thereof directly supporting the FTIV. As shown in FIG. 2, the canister 20 can include a connector 21 that extends outward from a surface 22 of the canister. This connector 21 can be a male connector, optionally including a ring or annular raised ridge 23. The connector 21 can be in the form of a cylindrical tube having an open end 24 that is in fluid communication with the interior 25 of the canister 20, where the adsorbent material is located. Of course, the connector 21 can come in a variety of other configurations, shapes and sizes and can be located along different surfaces and parts of the canister 20 in other applications.

In the current embodiment, the FTIV 10 can be mounted directly to the purge canister 20, optionally in a cantilevered manner, which means that the main valve body 30 and any fuel tank line 103 extend freely and outward from the canister and/or its components without being supported by a secondary bracket or mount that is connected to another portion of the vehicle 100, distal from the canister. Optionally, the FTIV 10 is supported substantially by the canister 20 for example its connector 21. There are no intermediate hoses, conduits, tubes or other elements disposed between the connector 21 and the second port 32 of the main valve body 30. This configuration thus eliminates the need for the main valve body or any other component of the FTIV from having to include a bracket extension or other mounting portion for mounting that FTIV to the body, frame or other component of the vehicle. Again, in contrast, the FTIV can be mounted simply by connecting the second port 32 of the main valve body directly to the canister optionally via the connector 21 extending from that canister. The connector 21, thus supports and cooperates in securing the FTIV and the main valve body 32 the canister, optionally via the fitting 40 associated with the second port 32 as described below.

The FTIV 10 can include a main valve body 30 having a first port 31 and a second port 32. The first port 31 can be joined with a first line or hose 103 which is connected to or otherwise in fluid communication with the fuel tank 102. Fuel vapors emitted from the fuel tank 102 can travel through the fuel vapor line 103 to the first port 31, with the FTIV 10 controlling the further movement or transfer of those vapors to the canister 20 as described below. The first port 31 can be joined with the first line 103 via any type of connector or fitting. Optionally, the first port 31 can be in the form of a male connector for plugging in and securing to a female SAE J2044 port interface. In this case, the first port 31 can include a male connector in the form of a tube 31T defining a first bore 31B that extends outwardly from the main valve body 30 and including a projecting ridge 31R. The end of the hose can include the female port, into which the male connector can be inserted and secured. Of course, other types of connections between the first line 103 and the first port 31 can be established. For example, these components can be connected via spring clips, clamps, or other connectors that provide a leak free union between the line and the first port.

Figure 3:
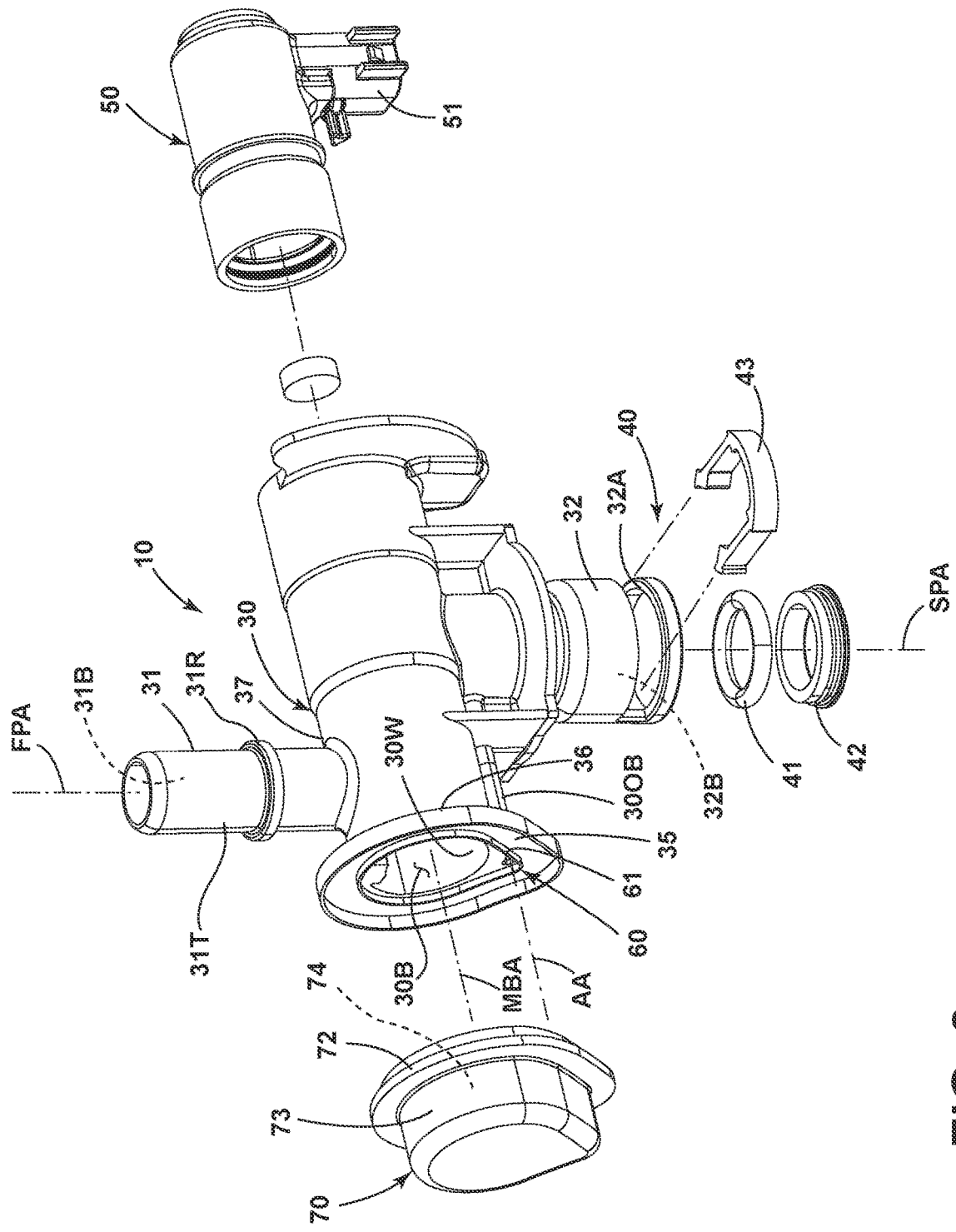
FIG. 3 is an exploded view of the fuel tank isolation valve.
Figure 5:
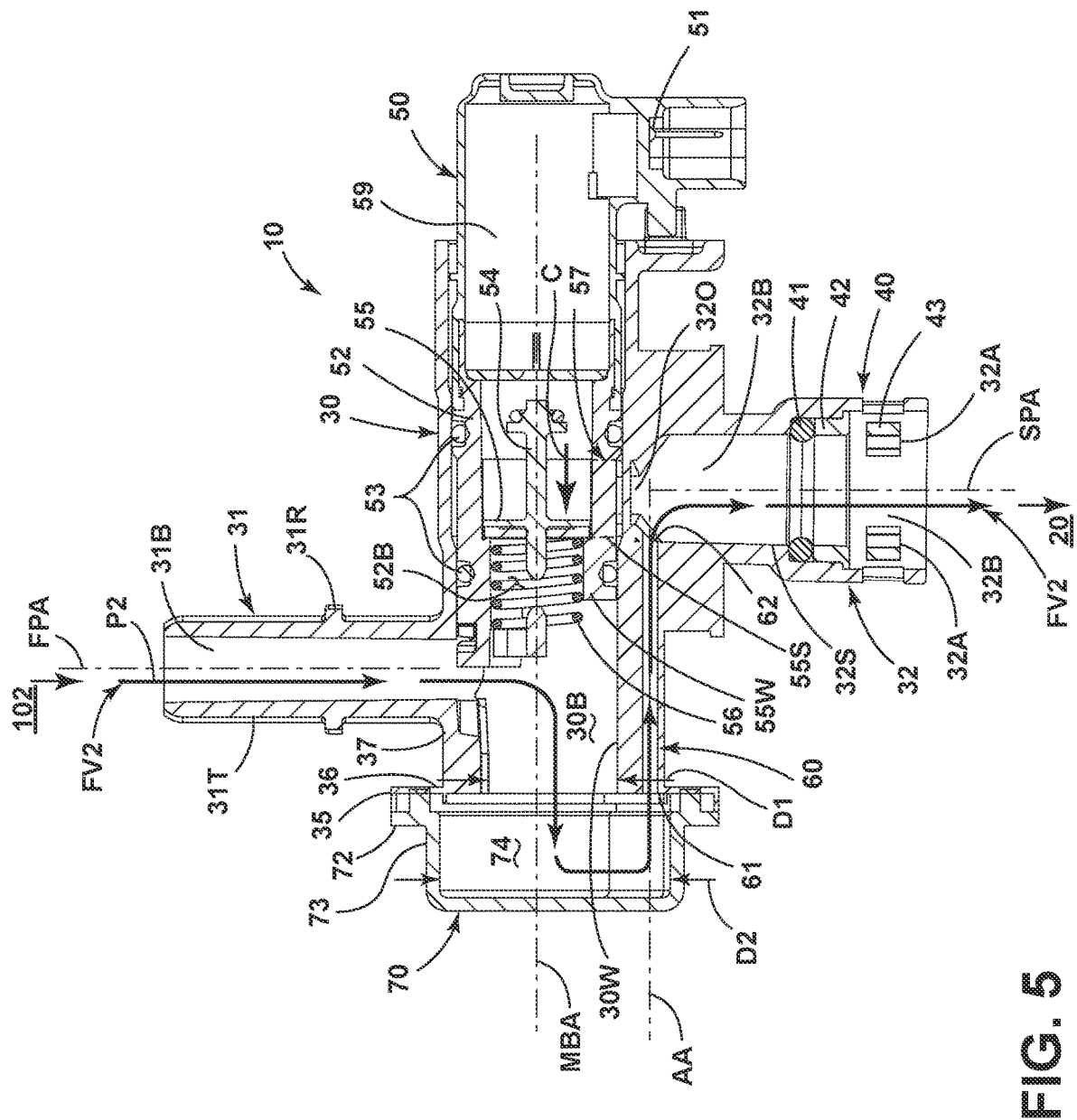
FIG. 5 is a section view of the fuel tank isolation valve with the vent solenoid in a closed mode.
Figure 6:
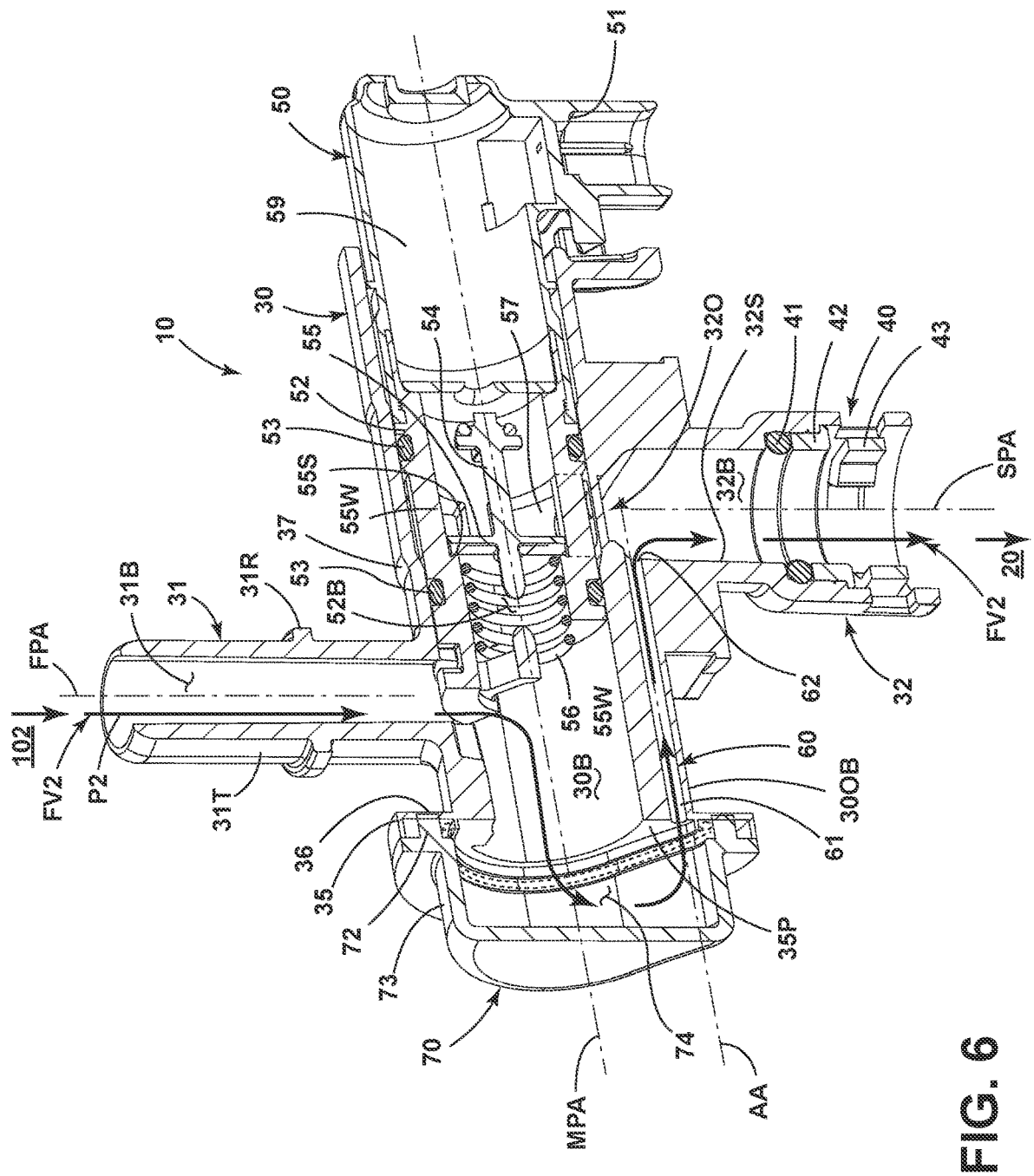
FIG. 6 is a perspective section view of the fuel tank isolation valve with the vent solenoid in an open mode.

The main valve body 30 can include the second port 32 as shown in FIGS. 3 and 5. This second port 32 can be distal from the first port. Optionally, the first port 31 can include a first port axis FPA and the second port 32 can include a second port access SPA. The first port axis FPA and the second port access SPA can be parallel but optionally offset from one another along the main bore 30B. These first and second port axes also can be transverse to the main bore axis MBA of the main bore 30B. In alternative constructions, the first port axis FPA and second port axis SPA can be perpendicular to the main bore axis MBA, and/or offset at different radial positions about the main bore axis.

The second port 32 can extend outward and away from the main valve body 30 and can include the fitting 40 as mentioned above. This fitting optionally can be the form of a push to connect fitting and more particularly and further optionally a female SAE J2044 port interface. This fitting 40 can define a female receiving bore also referred to as a second bore 32B that is in fluid communication with the main bore 30B. Fluid flow through a portion of the main bore 30B can be selectively controlled by an actuator 50, which optionally can be in the form of a vent solenoid, as described below. The female receiving bore 32B can be configured to receive the male connector 21 extending outwardly from the canister 20, without intervening hoses, conduits or lines (all of which can be referred to as intervening hoses) disposed between the canister 20 and that fitting 40. The connection between the connector 21 and the port 32 can be rigid and sturdy enough that the connector physically supports and orients the FTIV 10 on and adjacent the canister. This is accomplished without the FTIV needing a separate bracket or mounting plate to secure the FTIV to another vehicle component not associated with the canister 20. Again, this can reduce the mounting complexity and number of structures for mounting the FTIV relative to the canister and within the system 108 in general.

The fitting 40 can include an O-ring 41, a spacer 42 and a moveable clip 43. The can be an elastomeric O-ring configured to form a fluid tight seal between the spacer 42 and the port 32, in particular a shoulder 32S of the port 32. The spacer 42 can interface with the ridge 23 of the male connector 21 and can compress against the O-ring 41 to provide the seal. The clip 43 can be a channel shaped, C-shaped or U-shaped clip that extends through aperture 32A defined by the second port 32. The clip 43 can be operable in a release mode and a lock mode. In a lock mode, the clip can engage the connector 21 to secure the fitting 40 directly to the canister Optionally, the ridge 23 can be disposed and/or clamped between the spacer 42 and the clip 43, while the O-ring 41 forms the seal between the fitting 40 and the connector 21. The clip also is operable in a release mode, in which the clip 43 can be withdrawn partially or fully from aperture 32A of the second port 32 or fitting 40. When this occurs, the clip can disengage the connector 21, in particular the ridge 23, to allow the FTIV 10 to be removed from the connector 21 and thus the canister 20. Upon removal, the FTIV 10 is no longer supported by or connected to the canister.

Figure 4:
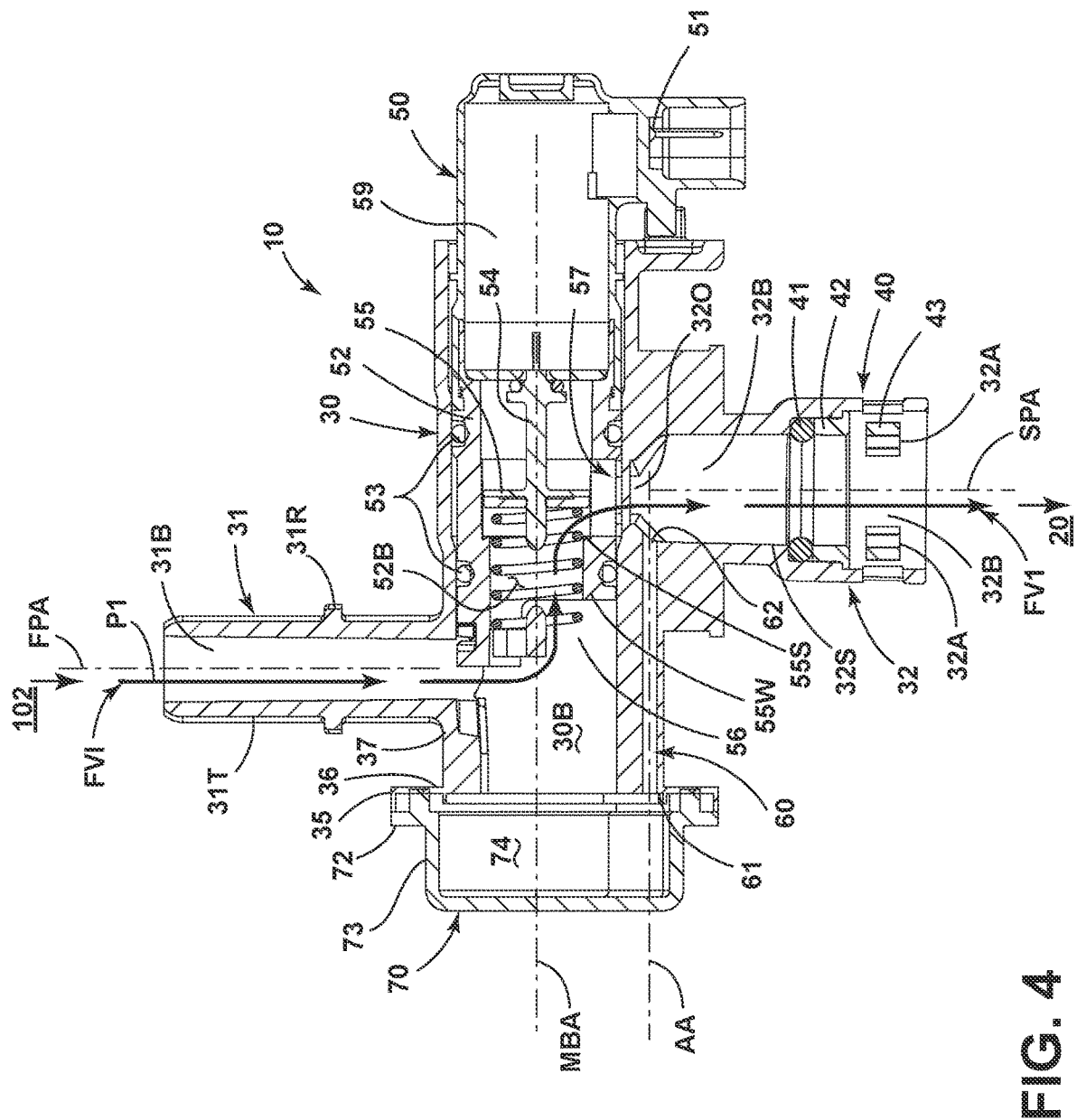
FIG. 4 is a section view of the fuel tank isolation valve having a vent solenoid in an open mode.

The fuel tank isolation valve 10 can be configured so that the main valve body 30 accommodates an actuator 50. As shown in FIG. 4, the actuator 50 can be in the form of a vent solenoid. Of course, in other applications, different types of actuators can be used to provide selective fluid communication between the first port and the second port, or more generally between the fuel tank and the canister to vent, purge or transfer fuel vapors from either or both components. The actuator shown as a vent solenoid 50 can be disposed within a portion of the main bore 30B. The vent solenoid 50 can include a connector 51 that connects the solenoid 50 to a power and/or control module (not shown) to operate the solenoid. The connector 51 can be in the form of a plug or socket to provide an electrical connection between the solenoid 50 and the power and/or control unit. The solenoid 50 can include a sleeve 52 that is disposed within the main bore 30B. The sleeve 52 can include seals 53 that seal around the sleeve 52 and within the main bore 30B, between the sleeve and the wall 30W of the main valve body or housing thereof. The seals optionally can be in the form of O-rings that are resistant to deterioration or damage due to contact with fuel vapors. The sleeve 52 can define a primary bore 52B within which a plunger 54 and an associated sealing member 55 are disposed. The plunger 54 can be moved and operated via the operating or power element 59 of the solenoid 50 which moves when powered through the connector 51 and controlled by an appropriate control module.

The primary bore 52B of the sleeve 52 can be in fluid communication and can open to the main bore 30B of the main valve body 30 to allow fluids, such as fuel vapors entrained in air, whether pressurized or not, to travel from the first port to the second port upon command. The primary bore 52B also can be in selective fluid communication with the second port 32 and in particular the second bore 32B thereof. As shown in FIG. 4, the power element 59 can move the plunger 54. The plunger 54 can move within the primary bore 52B in a reciprocal manner, toward and away from the power element 59. The vent solenoid 50 in FIG. 4 is in an open mode. In that open mode, the solenoid power element 59 can be unpowered. This open mode can be the default mode or state of the vent solenoid 50 such that the FTIV 10 can be in a normally open mode, allowing fuel vapors to transfer freely through the FTIV, from the fuel tank to the canister. Of course, in other applications, the FTIV might be configured in a normally closed mode, such that the fuel vapors do not transfer freely through, or are inhibited from freely transferring through the FTIV.

In the normally open mode shown in FIG. 4, the power element can be unpowered. As a result, a biasing element 56 of the actuator 50 can bias the sealing member 55 away from a shoulder 55S projecting outward from a wall 55W that surrounds the primary bore 52B. The biasing member as shown can be in the form of a coil spring, but alternatively can be in the form of a leaf spring, an elastomeric element or some other component that can push against or pull the sealing member, moving it away from the shoulder or other some other structure of the sleeve. The shoulder 55S can be an annular shoulder that extends around the primary bore 32B, generally circumferentiating the main bore axis MBA that coincides with an axis of the primary bore 32B. The sealing member 55 can be in the form of a plate which optionally can be circular and can be slightly larger then the diameter of the main bore at the shoulder 55S. Thus, when the sealing member 55 seals against that shoulder 55S, the main bore 30B can be physically separated and no longer in fluid communication with the primary bore 32B, nor the second port 32 as described below. The plate can be fixedly secured to the plunger and thus moves with the plunger in a reciprocal motion within the primary bore, when moved by the power element.

With further reference to FIG. 4, and as mentioned above, the actuator 50 shown there is in a normally open mode. In this normally open mode, fuel vapors FV1 can move along a first path P1 through the FTIV 10. In particular, fuel vapors FV1 can be motivated by a pressure differential between the fuel tank 102 and the canister 20. For example, the pressure in the fuel tank can increase above atmospheric pressure due to sloshing of fuel in the tank, refueling of the tank, evaporation of fuel in the tank, or other conditions. As a result, the tank becomes pressurized, and the fuel vapors FV1 in the tank move along the path P1. For example, they can move through the first line 103 and into the first port 31, traveling through the bore 31B of the first port 31. The first bore 31B can be in fluid communication with the main bore 30B of the valve body 30. As a result, the fuel vapors continue along, passing and moving through the main bore 30B. The fuel vapors FV1 also can move through the primary bore 52B of the vent solenoid 50. They can pass by the sealing member 55, due to the actuator being in an open mode, and through a venting aperture 57 that is in fluid communication with the primary bore 52B. As a result, the fuel vapors FV1 continue along the first past path P1 through the aperture 57 and into the second bore 32B of the second port 32 via the main valve secondary aperture 320. The vapors continue along the first path P1 and into the connector 21 of the canister 20, subsequently entering the canister 20 and the absorbent media in the canister, where those fuel vapors FV1 are temporarily captured and adsorbed.

As mentioned above, after time, with more and more fuel vapors FV1 traveling through the FTIV 10 to the canister and being stored in the canister, that canister can become saturated or loaded with those vapors. As a result, the canister can benefit from a purging operation in which a vacuum is drawn, optionally by the intake 106 through the fuel vapor vent line 101 on the interior cavity 25 of the canister 20. During the vacuum draw, the adsorbed fuel vapors and fuel molecules can be drawn to the intake and engine as described below, thereby regenerating the adsorbent material. As will be appreciated, the drawing of the vacuum can be controlled by other control valves and components of the vehicle 100.

More particularly, when the evaporative emissions control system 108 undergoes such a purging operation, a controller can actuate the vent solenoid 50 converting it to a closed mode in which fuel vapors from the first port 31 are inhibited from moving from the first port 31 to the second port 32 through the main bore 30B along the first path P1 due to the vent solenoid occluding the first path. To do so, the power element 59 can be powered to move the plunger 54 and the associated sealing member 55 in the main bore 52B in direction C as shown in FIG. 5. In turn, the biasing member 56 can be compressed and the sealing member 55 can engage the shoulder 55S within the primary bore 52B. This in turn seals off the main bore 52B from the aperture 57, the aperture 320 and the second bore 32B of the second port 32. Accordingly, fuel vapors FV1 cannot be drawn by a vacuum V that exerts a negative pressure within the second bore 32B. Again, the fuel vapors FV1 thus cannot move along the first path P1 through the main bore 30B, through the vent solenoid or actuator 50, and into the second bore 32B of the second port 32. The vapors also cannot travel through a connecting orifice or aperture 320 that provides fluid communication between the main bore 30B or primary bore 52B and the second bore 32B of the second port 32.

As mentioned above, when the actuator 50 is in the closed mode shown in FIG. 5, the fuel vapors directly from the fuel tank are not pulled in large volume via the vacuum V in a free flow condition through the first port, main valve body, main bore and the second port. In some cases, however, this can create a slight pressure differential between the fuel tank and the canister. To address this pressure differential and equalize the system pressure, the FTIV 10 can include a airflow bypass orifice 60. This airflow bypass orifice 60 can be defined by the housing forming the main valve body 30. This orifice 60 can be in fluid communication with the first port 31 and with the second port 32. Generally, the airflow bypass orifice 60 can allow fuel vapors FV2 to travel along a second path P2 through the FTIV 10. On this second path P2, as shown in FIG. 5, the vapors FV2 can vent from the first port 31 through the main bore 30B, through the airflow bypass orifice 60, to the second port 32 and ultimately to the canister 20. This travel of the vapors fuel vapors FV2 along the second path P2 from the fuel tank 102 to the canister 20 can all occur while the actuator or vent solenoid 50 is in the closed mode shown in FIG. 5. The fuel vapors FV2 are inhibited from moving from the first port 31 to the second port 32 through the vent solenoid 50, through the primary bore 52B, through the aperture 57 and secondary aperture or orifice 320, along the first path P1 shown in FIG. 4 while the actuator 50 is in a closed mode.

Optionally, the second orifice 320 can be defined in a sidewall 30W surrounding the main bore 32B of the main valve body 30. The sidewall 30W can surround the main bore 30B and can form the boundaries of that main bore 30B. The second orifice 320 can include a orifice axis OA which can be common with the second port axis SPA and/or aligned with it. This orifice axis OA can be generally perpendicular to the bore main bore axis MBA of the main bore 30B.

With reference to FIGS. 3 and 5, the airflow bypass orifice 60 can be in the form of an elongated tube that extends through a portion of the main valve body 30. The orifice can be located optionally radially outward from the main bore 30B, and further optionally within a side wall 30W of the main valve body 30. The orifice, which can form an elongated tube or hollow structure, can extend from a first opening 61 to a second opening 62. The first opening 61 can be defined by the main valve body and can form a first end of the airflow flow bypass orifice. The second opening 62 also can be defined by the main valve body 30, and in particular, by a sidewall 32S of the second port 32. The second opening also can form a second end of the airflow bypass orifice 60. The first opening 61 shown in FIG. 3 can be defined in an outer rim 35 of the main valve body 30. The outer rim 35 can be configured such that the main bore axis MBA projects orthogonally out from the plane in which the outer rim 35 is disposed. The outer rim 35 can surround the main bore 30B and can include a flange 36 that extends outwardly from the sleeve portion 37 of the main body.

As shown in FIGS. 3 and 5, the airflow bypass orifice 60 can include an airflow axis AA and can extend generally long that axis. This axis AA can be parallel to the main bore axis MBA, but perpendicular to the orifice axis OA and the second port axis SPA. Of course in other applications, where the ports, orifice and main bore are in different configurations relative to one another, these orientations differ from those shown. In some cases, the main valve body 30 can be structured to include a portion or projection in the form of an orifice block 300B. The airflow bypass orifice 60 can be defined within and can extend through this orifice block 300B, generally extending from the rim outer rim 35 toward the second port 32.

The airflow bypass orifice 60 is shown in the form of a linear tube or hollow feature. Of course, in other applications, the orifice 60 can include angled or curved portions, while still providing fluid communication between the main bore 30B and the secondary port second port 32 when the actuator 50 is in the closed mode. The orifice 60, and the respective first opening 61 and second opening 62, can be calibrated to provide the appropriate amount of flow of the fuel vapors FV2 along the second path P2. In some cases, the orifice can have a diameter of less than 5.0 mm, less than 3.0 mm, less than 2.0 mm, less than 1.0 mm, between 0.5 mm and 3.0 mm, inclusive, between 1.0 mm and 2.5 mm, inclusive, between 1.5 mm and 2.0 mm, or other diameters or inner dimensions, depending on the application and the suitable airflow to equalize the pressure in the system 108 through the orifice 60.

As shown in FIG. 5, the airflow bypass orifice 60 can include axis AA, which also can be generally perpendicular to the first port axis FPA. The orifice 60 can be define adjacent, or in some cases at least partially within the sidewall 30W of the main valve body 30. The orifice 60 can extend generally parallel to the main bore 30B and to the inner side wall 30W bounding that bore 30B. The orifice 60 can be distal from the actuator 50 and offset radially outward from the wall 30W bounding the bore 30B.

Optionally, although not shown, there can be additional airway bypass orifices disposed one adjacent the other, defined by the main valve body 30, for example in the block 320B or sidewall 30W, or as separate tubular components joined with the main valve body 30. Further optionally, although not shown, the orifice 60 can extend from the port 32, with the second opening 62 opening into the second bore 32. The first opening 61 of the orifice 60, however, can open directly through the sidewall 30W of the main valve body 30, directly into the main bore 30B, instead of opening distal from the main bore 30B within the outer rim 35. Other configurations and layouts of the orifice are contemplated. Generally, in those configurations, the orifice can provide a passageway around the closed off primary bore 52B of the actuator 50, thereby fluidly connecting the first port and second port with one another and/or the main bore so that fuel vapors FV2 can travel along a pathway from the first port to the second port, even though the actuator is in a closed mode.

As shown in FIGS. 3 and 5, the fuel tank isolation valve FTIV 10 can include a cover 70. This cover 70 can be joined with the main valve body 30 and mounted in an opposing manner relative to the actuator 50 as shown. Of course, in other configurations, where the main valve body is set up slightly differently, the cover 70 can be offset or another orientations relative to the actuator 50. The cover 70 can be aligned with the main bore axis MBA and can close off the portion of the main bore 30B. In so doing, the cover can render the main bore 30B a closed compartment, but of course with exterior openings to the first port and second port. Generally, the cover 70 can be joined with the main valve body at the outer rim 35 and can optionally overlap at least a portion of the flanged 36 of the main valve body 30.

With further reference to FIG. 3, the cover 70 can include a base 72 and a wall 73 extending from the base. The base can extend outward and away from the wall. The base 72 can be joined with the outer rim 35 the main valve body. This joining can be achieved via sonic welding, bonding, and adhering, or otherwise fastening the cover to the body, which can effectively seal and isolate the orifice 60 and the main bore 30B from the environment. The cover base 72 and wall 73 can be of a round or teardrop configuration, generally matching the shape and configuration of the outer rim 35 and any optional flange 36 of the main valve body 30. The projecting portion 35P of the outer rim 35 can project farther away from the main bore axis MBA than the remainder of the rim, and can form an area along the rim to accommodate and define the first opening 61 and orifice 60 in general.

Optionally, the main bore 30B can have a first dimension or diameter D1. The cover in particular, the cover cavity 74 can include an internal second dimension or diameter D2. The second dimension or diameter D2 can be greater than the first dimension or diameter D1. With larger diameter or dimension D2, the wall 73 and flange 72 of the cover can extend beyond and optionally not overlap the main bore 30B and not close off or occlude the opening 61 of the orifice Again, this positioning of the cover can allow fluid communication between the orifice 60 and the main bore 30B, even with the cover joined with the main valve body.

The cover 70 can define a cover cavity 74 that is common with the main bore 30B when the cover is installed on the body. The cover cavity 74 and the main bore 30B thus can be in full fluid communication with one another. Thus, fuel vapors FV2 from the fuel tank 102 can pass along the second path P2, through the main bore 30B, through the cover cavity 74, to the first opening 61 and the outer rim 35 of the main valve body 30. Fuel vapors can travel through the orifice 60, to the second opening 62, where they can exit the orifice 60 into the second port 32.

Optionally, in some applications, the cover 70 can be absent from main valve body 30. In those applications, the main bore 30B can be closed off by a lateral wall extending optionally perpendicular to the main bore axis MBA. The orifice 60 as mentioned above can extend to a first opening that is defined by the side wall 30W of the main bore 30B. The first opening can thus open directly into the main bore 30B, optionally directed and facing toward the main bore axis MBA. In this alternative construction, the orifice can also extend to the second opening 62, which can open directly into the second bore 32B.

As further shown in FIG. 5, the cover 70 can be joined with the main valve body 30 and can form an extension of the tube or sleeve 37 thereof. Fuel vapors FV2 can move along the second path P2, can travel through the main valve body 30, within the main bore 30B, out of the main valve body 30, and through the cover cavity 74. Along that second path P2, those vapors can travel back into part of the main valve body 30 by passing through the first opening 61 into the orifice 60 and out the second opening 62.

The various components of the FTIV 10 can be constructed from polymers, composites, and in some cases metals, or combinations of the foregoing. The main valve body, ports and cover can be injection molded from polymers, and later finished and/or trimmed, depending on the application. Where the cover and main body are separately constructed or molded from plastic, these components can be placed adjacent one another and sonic welded to one another. Of course, the cover can be joined with the main valve body using other techniques and materials to join those components.

A method of using the fuel tank isolation valve 10 of the current embodiment will now be described. As mentioned above, the FTIV 10 can be used in an evaporative emissions control system 108 of a vehicle 100. The valve 10 can be assembled and placed generally between the fuel tank 102 and the canister 20. This placement and installation of the FTIV 10 can be performed with ease due to its direct mounting of the valve to the canister 20. A user can connect the first line 103 to the tank and to the first port 31 of the valve 10. The user can then place the valve 10 in close proximity to the canister, generally aligning the port 32 and fitting 40 with the connector 21 extending from the canister 20, as shown in FIG. 2. The user can place the connector 21 extending from the canister in the female receiving bore or second bore 32B directly, without any intervening hoses, conduit, tube or other component disposed between the canister and the fitting 40. The ridge 23 of the connector 21 can engage the spacer 42 and compress the O-ring 41, forming a seal within the fitting and port about the connector 21.

The user can manually engage the fitting, 40 so that the clip 43 converts from a release mode to a lock mode. In the lock mode, the clip 43 engages the male connector 21, optionally trapping the ridge 23 between the clip 43 and the spacer 42. In turn, this secures the fitting 40 to the canister 40 in a sealed configuration. The fitting and the canister are secured directly to one another. The FTIV 10 and main body 30 thus also are directly secured and mounted directly to the connector 21 and the canister 20 in general. The main valve body 30 and the FTIV can be supported in a cantilevered manner by the connector of the canister 20. In this configuration, with this connection, the FTIV 10 does not need any additional brackets, components, or structures to mount it to another component of the vehicle because it is already sufficiently mounted and held in place adjacent the canister 20 via the connector 21 interacting with the fitting 40. With the FTIV 10 sufficiently mounted and secured to the canister 20, assembly of that portion of the evaporative emissions control system 108 can be completed.

The FTIV 10 as mentioned above can include an actuator 50, optionally in the form of a vent solenoid. The vent solenoid 50 can be in a normally open mode as shown in FIG. 4. In this mode, fuel vapors FV1 can move along a path P1 from the fuel tank 102 through the first port 31, through the main bore 30B, through the actuator 50, through the valve body orifice 320, through the second port 32, to the canister 20 where those fuel vapors can be trapped and temporarily stored.

During a purging operation, the actuator 50 can be converted to a closed mode as described above. In the closed mode, the actuator 50 closes off or occludes at least part of the first path P1 so that fuel vapors are inhibited and/or prevented from moving from the first port 31 to the second port 32 through the main bore 30B along the first path P1. Again, this can occur via the sealing member 55 sealing off the primary bore 52B and thus isolating the main bore 30B from the orifice 320 and the second port 32, and in particular the second bore 32B. Even in this closed mode, however, fuel vapors can be conveyed in a metered or calibrated manner through the bypass airflow bypass orifice 60, as dictated by the operating parameters of the vehicle in which the FTIV is installed. As shown in FIG. 5, the fuel vapors FV2 can be conveyed from the first port, through the main bore, into the second port along the second path P2 via the airflow bypass orifice 60. This can occur while the vent solenoid 50 is in the closed mode shown there, in which the fuel vapors are inhibited from moving from the first port to the second port, through the vent solenoid and main bore along the first path, due to the vent solenoid occluding or the closing off the first path in the closed mode. The minimal, calibrated flow of the fuel vapors FV2 along the second path P2, while the vent solenoid is in the closed mode, can equalize pressure within the fuel tank 102 and the canister 20 during the purging operation on the canister in which vacuum is drawn by the engine 106 through the intake 107 and the fuel vapor vent line 101.

After the purging operation is complete, the actuator 50 can be controlled by a controller and return to the normally open configuration shown in FIG. 4. The first flow path P1 can be reestablished so that the fuel vapors FV1 can continue to travel along that path. The flow along the first path P1 in the open mode between the fuel tank 102 and the canister 20 can be greater than the flow of the vapors between the fuel tank 102 and the canister 20 in the closed mode shown in FIG. 5.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A fuel tank isolation valve in an evaporative emissions system having a fuel tank and a canister, the fuel tank isolation valve comprising:

a main valve body including an outer rim, a first port and a second port, the first port in fluid communication with a fuel tank and the second port in fluid communication with a fuel vapor canister, the main valve body defining a main bore through which vented fuel vapors can move from the first port to the second port, the main bore including a main bore axis;

an actuator joined with the main valve body and disposed in the main bore, the actuator operable in an open mode in which fuel vapors from the first port can move to the second port through the main bore along a first path, and a closed mode in which fuel vapors are inhibited from moving from the first port to the second port through the main bore along the first path due to the actuator occluding the first path;

an airflow bypass orifice defined by the main valve body and including a first opening defined by the outer rim and a second opening that opens to the second port, the airflow bypass orifice parallel to the main bore and in fluid communication with the first port and with the second port; and a cover defining a cover cavity and including a base and a wall, the base joined with the outer rim of the main valve body, the wall extending away from the outer rim, wherein the airflow bypass orifice allows fuel vapors to be vented from the first port, through the main bore and the cover cavity to enter the first opening in the outer rim and exit the second opening into the second port along a second path, while the actuator is in the closed mode and the fuel vapors are inhibited from moving from the first port to the second port through the main bore along the first path due to the actuator occluding the first path, whereby flow of fuel vapors along the second path through the airflow bypass orifice equalizes pressure within the fuel tank and canister during a purging operation on the canister in which a vacuum is drawn by an engine through the canister.

2. The fuel tank isolation valve of claim 1 comprising:
the cover joined with the main valve body and mounted in an opposing manner relative to the actuator.

3. The fuel tank isolation valve of claim 2,
wherein the cover is aligned with the main bore axis and closes off a portion of the main bore,
wherein the cover includes an annular flange that is joined to the main valve body.

4. The fuel tank isolation valve of claim 1,
wherein the actuator is a vent solenoid comprising a biasing member that biases a sealing member away from a shoulder of the vent solenoid in the open mode, which is a normally open mode, to promote flow of fuel vapors along the first path.

5. The fuel tank isolation valve of claim 4,
wherein the vent solenoid compresses the biasing member so that the sealing member engages the shoulder in the closed mode to inhibit flow along the first path.

6. The fuel tank isolation valve of claim 1, comprising:
a push to connect fitting defining a female receiving bore configured to receive a male connector extending outward from the canister without an intervening hose disposed between the canister and the fitting.

7. The fuel tank isolation valve of claim 6,
wherein the fitting includes an o-ring, a spacer adjacent the o-ring and a clip operable in a lock mode in which the clip engages the male connector to secure the fitting to the canister in a sealed configuration, and a release mode in which the clip allows the male connector to exit the female receiving bore.

8. The fuel tank isolation valve of claim 1,
wherein the first port includes a first port axis,
wherein the second port includes a second port axis,
wherein the first port axis and second port axis are transverse to the main bore axis.

9. A fuel tank isolation valve in an evaporative emissions system having a fuel tank and a canister, the fuel tank isolation valve comprising:
a main valve body including a first port and a second port, the first port in fluid communication with a fuel tank and the second port in fluid communication with a fuel vapor canister, the main valve body defining a main bore through which vented fuel vapors can move from the first port to the second port, the main bore including a main bore axis;
a push to connect fitting defining a female receiving bore configured to receive a male connector extending outward from the canister without any intervening hoses disposed between the canister and the fitting, the fitting including an o-ring, a spacer adjacent the o-ring and a clip operable in a release mode and a lock mode in which the clip engages the male connector to secure the fitting to the canister in a sealed configuration;
a vent solenoid joined with the main valve body and disposed in the main bore, the vent solenoid operable in a normally open mode in which fuel vapors from the first port can move to the second port through the main bore along a first path, and a closed mode in which fuel vapors are inhibited from moving from the first port to the second port through the main bore along the first path due to the vent solenoid occluding the first path; and
an airflow bypass orifice having a first opening defined by the main valve body at a first end and a second opening defined by the second port at a second end, the airflow bypass orifice defined by the main valve body in fluid communication with the first port and with the second port; and
a cover closing off a portion of the main bore and defining a cover cavity in common fluid communication with the first opening and the main bore,
wherein the airflow bypass orifice allows fuel vapors to be vented from the first port, through the main bore, into the cavity, through the first opening, through the airflow bypass orifice, through the second opening, out the second port, and to the canister along a second path without passing through a hose between the second port and the canister, while the vent solenoid is in the closed mode and the fuel vapors are inhibited from moving from the first port to the second port through the vent solenoid and main bore along the first path due to the vent solenoid occluding the first path,
whereby flow of fuel vapors along the second path through the airflow bypass orifice equalizes pressure within the fuel tank and canister during a purging operation on the canister in which a vacuum is drawn by an engine through the canister.

10. The fuel tank isolation valve of claim 9, wherein the cover includes a wall and is:
joined with the main valve body distal from the vent solenoid.

11. The fuel tank isolation valve of claim 10,
wherein the cover is aligned with the bore axis and closes off a portion of the main bore,
wherein the cover includes a base that is joined to the main valve body such that the cover cavity and the wall of the cove extend away from the vent solenoid.

12. The fuel tank isolation valve of claim 9,
wherein the vent solenoid comprises a biasing member that biases a sealing member away from a shoulder of the vent solenoid in the normally open mode to promote the flow of fuel vapors along the first path.

13. The fuel tank isolation valve of claim 12,
wherein the vent solenoid compresses the biasing member so that the sealing member engages the shoulder in the closed mode to inhibit flow along the first path.

14. A method of using a fuel tank isolation valve, the method comprising:
providing a main valve body having a first port and a second port, the second port including a fitting defining a female receiving bore, the main valve body housing a vent solenoid in a main bore that is in fluid communication with the first port and the second port, the main valve body joined with a cover defining a cover cavity distal from the vent solenoid, the main valve body defining an airflow bypass orifice in fluid communication with the first port and with the second port;
placing a male connector extending outward from a fuel vapor canister in the female receiving bore, without any intervening hose disposed between the canister and the fitting;
engaging the fitting so that a clip, adjacent a spacer and an o-ring, converts from a release mode to a lock mode in which the clip engages the male connector to secure the fitting to the canister in a sealed configuration, the fitting and canister being secured directly to one another with the main valve body supported in a cantilevered manner by the male connector of the fuel vapor canister,
operating the vent solenoid in a closed mode in which fuel vapors are inhibited from moving from the first port to the second port through the main bore along a first path due to the vent solenoid occluding the first path; and conveying fuel vapors from the first port, through the main bore, through the cover cavity, and then through the airflow bypass orifice, to the second port along a second path, while the vent solenoid is in the closed mode, and the fuel vapors are inhibited from moving from the first port to the second port through the vent solenoid and main bore along the first path due to the vent solenoid occluding the first path in the closed mode.

15. The method of claim 14 comprising:

wherein the conveying of fuel vapors along the second path through the airflow bypass orifice equalizes pressure within a fuel tank and a canister during a purging operation on the canister in which a vacuum is drawn by an engine through the canister.

16. A fuel tank isolation valve in an evaporative emissions system having a fuel tank and a canister, the fuel tank isolation valve comprising:

a main valve body including a first port and a second port, the first port in fluid communication with a fuel tank and the second port in fluid communication with a fuel vapor canister, the main valve body defining a main bore through which vented fuel vapors can move from the first port to the second port, the main bore including a main bore axis;

a push to connect fitting defining a female receiving bore configured to receive a male connector extending outward from the canister without any intervening hoses disposed between the canister and the fitting, the fitting including an o-ring, a spacer adjacent the o-ring and a clip operable in a release mode and a lock mode in which the clip engages the male connector to secure the fitting to the canister in a sealed configuration;

a vent solenoid joined with the main valve body and disposed in the main bore, the vent solenoid operable in a normally open mode in which fuel vapors from the first port can move to the second port through the main bore along a first path, and a closed mode in which fuel vapors are inhibited from moving from the first port to the second port through the main bore along the first path due to the vent solenoid occluding the first path; and an airflow bypass orifice having a first opening defined by the main valve body at a first end and a second opening defined by the second port at a second end opposite the first end, the airflow bypass orifice defined by the main valve body in fluid communication with the first port and with the second port, wherein the airflow bypass orifice allows fuel vapors to be vented from the first port, through the main bore, through the first opening, through the airflow bypass orifice, which is devoid of any biasing element between the first opening and the second opening, through the second opening, out the second port, and to the canister along a second path, without passing through a hose between the second port and the canister, while the vent solenoid is in the closed mode and the fuel vapors are inhibited from moving from the first port to the second port through the vent solenoid and main bore along the first path due to the vent solenoid occluding the first path, whereby flow of fuel vapors along the second path through the airflow bypass orifice equalizes pressure within the fuel tank and canister during a purging operation on the canister in which a vacuum is drawn by an engine through the canister.

* * * * *